US012578488B2

(12) United States Patent
Bharkhada et al.

(10) Patent No.: US 12,578,488 B2
(45) **Date of Patent: *Mar. 17, 2026**

(54) ATTENUATION MAP GENERATED BY LSO BACKGROUND

(71) Applicant: Siemens Medical Solutions USA, Inc., Malvern, PA (US)

(72) Inventors: Deepak Bharkhada, Knoxville, TN (US); Vladimir Panin, Knoxville, TN (US); Mohammadreza Teimoorisichani, Knoxville, TN (US); Maurizio Conti, Knoxville, TN (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 458 days.

This patent is subject to a terminal disclaimer.

(21) Appl. No.: 18/004,198

(22) PCT Filed: Sep. 9, 2020

(86) PCT No.: PCT/US2020/070506
§ 371 (c)(1),
(2) Date: Jan. 4, 2023

(87) PCT Pub. No.: WO2022/055537
PCT Pub. Date: Mar. 17, 2022

(65) Prior Publication Data
US 2023/0266489 A1     Aug. 24, 2023

(51) Int. Cl.
*G01T 1/29* (2006.01)
*G06T 7/00* (2017.01)

(52) U.S. Cl.
CPC .......... *G01T 1/2985* (2013.01); *G06T 7/0012* (2013.01); *G06T 2207/10081* (2013.01);
(Continued)

(58) Field of Classification Search
None
See application file for complete search history.

(56) References Cited

U.S. PATENT DOCUMENTS 9,031,300 B1 *  5/2015  Manjeshwar ......... G06T 11/003
382/128
9,153,012 B2 * 10/2015  Bredno .................... G06T 5/50
(Continued)

FOREIGN PATENT DOCUMENTS

CN       101530330       9/2009
CN       110151210       8/2019
(Continued)

OTHER PUBLICATIONS

Arabi, Hossein, and Habib Zaidi. "Deep learning-guided estimation of attenuation correction factors from time-of-flight PET emission data." Medical image analysis 64, p. 101718 (Year: 2020).*
(Continued)

*Primary Examiner* — Scott A Rogers

(57) ABSTRACT

Various systems and computer-implemented methods for background radiation based attenuation correction are disclosed. Nuclear scan data including scan data associated with a first imaging modality and background radiation data are received. An initial background radiation attenuation map is generated and provided to a trained model configured to generate a final background radiation based attenuation map from the initial background radiation attenuation map. Attenuation correction of the scan data associated with the first imaging modality is performed based on the background radiation based attenuation map and a nuclear image is reconstructed from attenuation corrected scan data associated with the first imaging modality.

20 Claims, 8 Drawing Sheets

(52) U.S. Cl.
    CPC ............... *G06T 2207/10104* (2013.01); *G06T*
                                *2207/20084* (2013.01)

(56) References Cited

U.S. PATENT DOCUMENTS

| | | | | |
|---|---|---|---|---|
| 9,693,751 | B2 * | 7/2017 | Panin ....................... | G01T 7/005 |
| 2009/0032716 | A1 | 2/2009 | Wieczorek et al. | |
| 2009/0169082 | A1 * | 7/2009 | Mizuta ................... | A61B 6/037 |
| | | | | 382/131 |
| 2014/0228673 | A1 | 8/2014 | Watson | |
| 2016/0069973 | A1 * | 3/2016 | Fenchel ............... | G01R 33/481 |
| | | | | 324/309 |
| 2018/0300907 | A1 | 10/2018 | Ding et al. | |
| 2018/0330233 | A1 | 11/2018 | Rui et al. | |
| 2023/0049556 | A1 * | 2/2023 | Spottiswoode ........... | G06T 7/30 |
| 2023/0252694 | A1 * | 8/2023 | Bharkhada ........... | A61B 6/5205 |
| | | | | 382/131 |
| 2023/0401769 | A1 * | 12/2023 | Bharkhada ........... | A61B 6/5205 |
| 2024/0233213 | A1 * | 7/2024 | Qiang ................... | G06T 11/005 |

FOREIGN PATENT DOCUMENTS

| | | | |
|---|---|---|---|
| CN | 110151210 A | * | 8/2019 |
| JP | 2006312027 | | 11/2006 |
| JP | 2007101341 | | 4/2007 |
| WO | 2021175781 | | 9/2021 |

OTHER PUBLICATIONS

Lee, Jae Sung. "A review of deep-learning-based approaches for attenuation correction in positron emission tomography." IEEE Transactions on Radiation and Plasma Medical Sciences 5.2, pp. 160-184 (Year: 2020).*

Patton, James A., and Timothy G. Turkington. "SPECT/CT physical principles and attenuation correction." Journal of nuclear medicine technology 36.1, pp. 1-10 (Year: 2008).*

Shi, Luyao, et al. "Deep learning-based attenuation map generation for myocardial perfusion SPECT." European Journal of Nuclear Medicine and Molecular Imaging 47, pp. 2383-2395 (Year: 2020).*

Berker, Yannick, and Yusheng Li. "Attenuation correction in emission tomography using the emission dataâa review." Medical physics 43.2, pp. 807-832 (Year: 2016).*

Omidvari, Negar, et al. "Lutetium background radiation in total-body PETâA simulation study on opportunities and challenges in PET attenuation correction." Frontiers in Nuclear Medicine 2, p. 963067 (Year: 2022).*

International Search Report received for corresponding PCT Application No. PCT/US2020/070506, mailed May 21, 2021.

Shi, Luyao et al: "A Novel Loss Function Incorporating Imaging Acquisition Physics for PET Attenuation Map Generation Using Deep Learning"; Oct. 10, 2019 (Oct. 10, 2019); Advances in Inteligent Data Analysis Xix, (Lecture Notes in Computer Science, Lect. Notes Computer); Springer International Publishing; Cham; pp. 723-731; XP047522856.

Mehranian, Abolfazl et al: "Vision 20/20: Magnetic resonance imaging-guided attenuation correction in PET/MRI: Challenges, solutions, and opportunities"; Medical Physics, AIP, Melville, NY, US; vol. 43; No. 3; Feb. 8, 2016 (Feb. 8, 2016); pp. 1130-1155; XP012204972.

Ishibashi Hiroyuki and one other, [1] World of PET from the Perspective of Scintillators, Report on Next-Generation PET Research for Fiscal Year 2006, National Institute of Radiological Sciences, Mar. 1, 2007, pp. 66-70. [With Translated Relevant Parts].

* cited by examiner

200

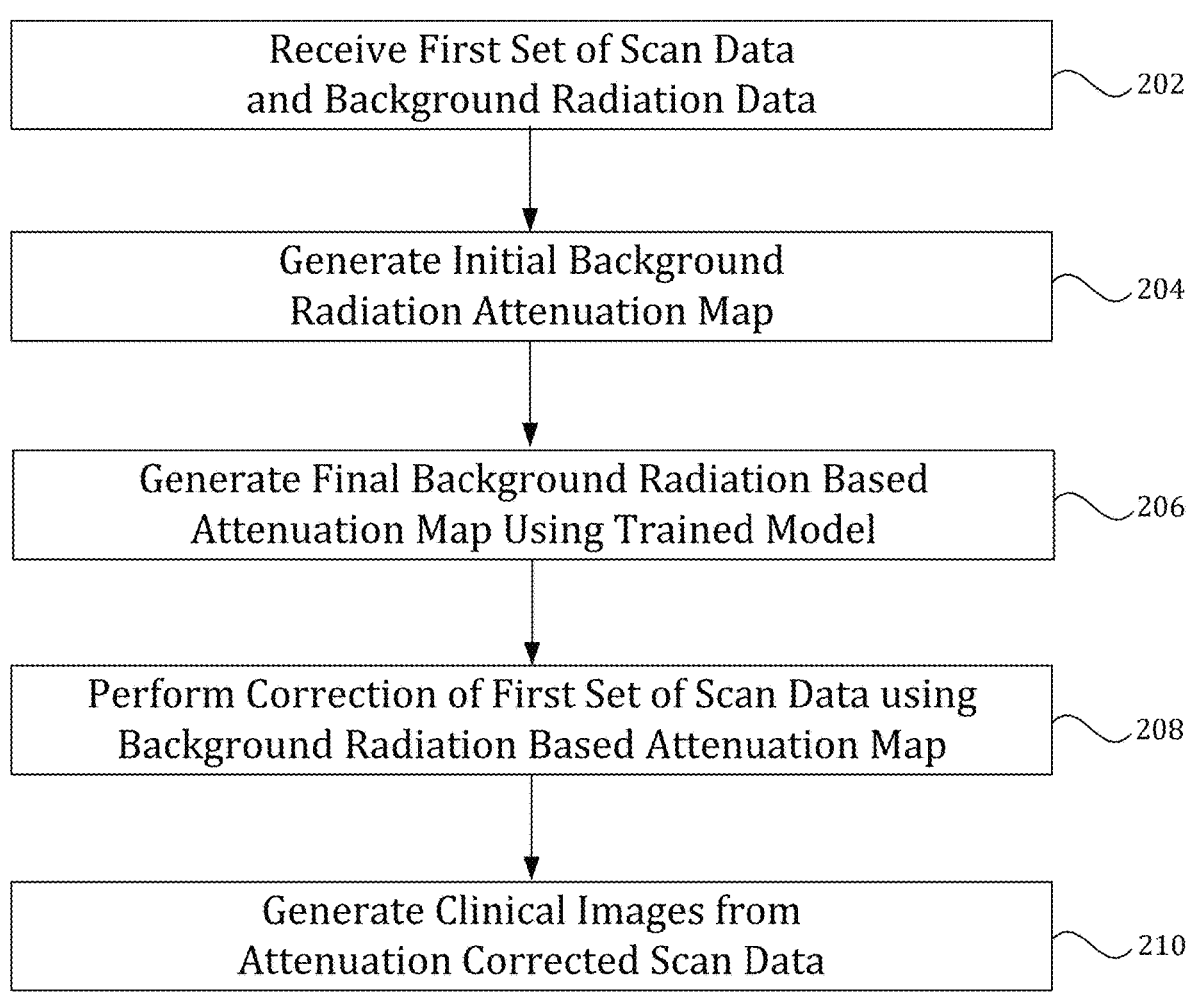

Receive First Set of Scan Data
and Background Radiation Data ⟩ 202

Generate Initial Background
Radiation Attenuation Map ⟩ 204

Generate Final Background Radiation Based
Attenuation Map Using Trained Model ⟩ 206

Perform Correction of First Set of Scan Data using
Background Radiation Based Attenuation Map ⟩ 208

Generate Clinical Images from
Attenuation Corrected Scan Data ⟩ 210

Fig. 3

200a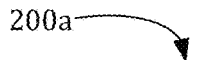

| Receive First Set of Scan Data and Background-Radiation Data | 202 |

↓

| Generate Initial Background Radiation Attenuation Map | 204 |

↓

| Generate Initial Background Radiation Inclusive Attenuation Map Using MLAA | 212 |

↓

| Generate Final Background Radiation Inclusive Attenuation Map Using Trained Model | 206 |

↓

| Perform Attenuation Correction Using Final Background Radiation Inclusive Attenuation Model | 208 |

↓

| Generate Clinical Images from Attenuation-Corrected First Set of Scan Data | 210 |

Fig. 5

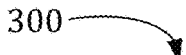
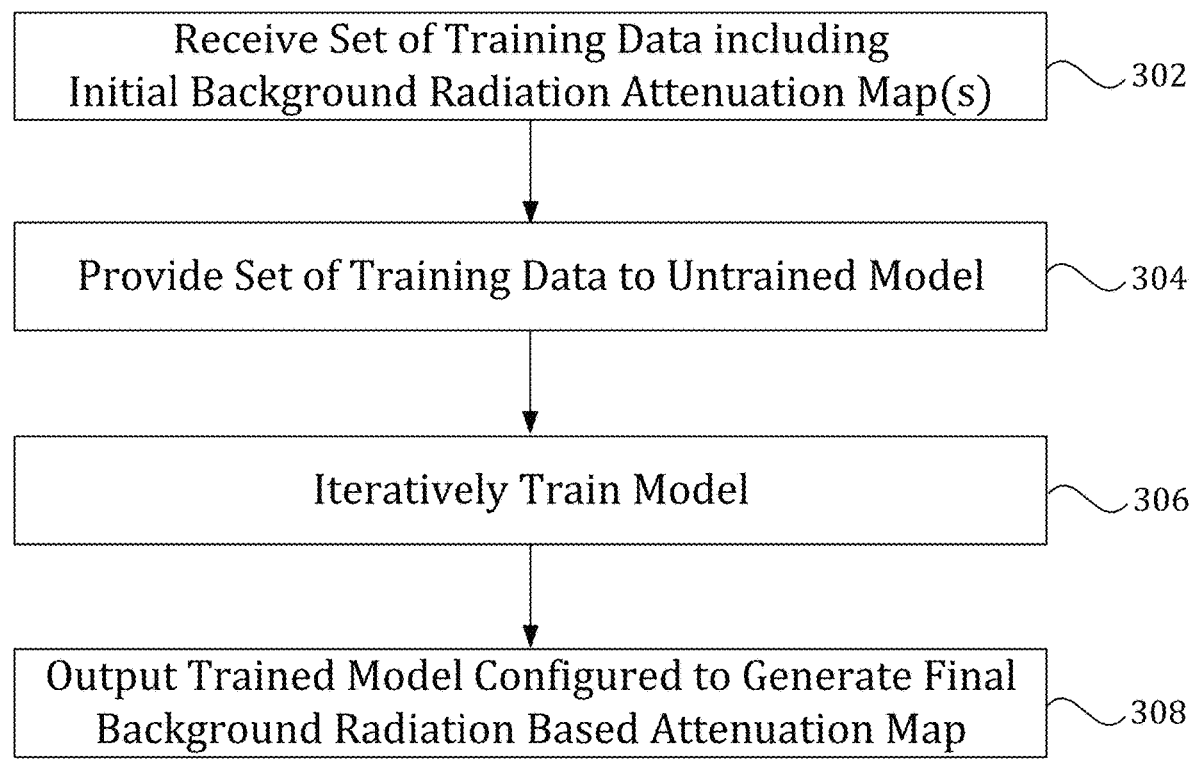
Receive Set of Training Data including
Initial Background Radiation Attenuation Map(s) ⟋302
Provide Set of Training Data to Untrained Model ⟋304
Iteratively Train Model ⟋306
Output Trained Model Configured to Generate Final
Background Radiation Based Attenuation Map ⟋308
Fig. 7

ATTENUATION MAP GENERATED BY LSO BACKGROUND

TECHNICAL FIELD

This application relates generally to attenuation correction of nuclear imaging and, more particularly, to attenuation correction of nuclear imaging obtained using lutetium oxyorthosilicate (LSO) or lutetium yttrium oxyorthosilicate (LYSO) scintillation crystals.

BACKGROUND

During nuclear imaging, a patient is positioned on a table and data is obtained using one or more scanning modalities, such as, for example, computerized-tomography (CT), positron-emission tomography (PET), single-photon emission computerized tomography (SPECT), magnetic resonance (MR) etc. Multiple data sets can be collected for a single patient. Different types of reconstructions are generated to control for and/or eliminate artifacts. Although each reconstruction uses different parameters, the underlying patient is the same for each reconstruction.

Attenuation correction is performed to provide quantitatively accurate radio-isotope distributions from various imaging modalities. For example, PET-CT scanners perform additional CT scans to obtain attenuation map information, which is used to perform attenuation correction. However, this additional acquisition increases the radiation dose to the patient. Current PET-MR scanners utilize attenuation maps derived from a Dixon sequence. Dixon-derived maps are inaccurate.

SUMMARY

In various embodiments, a computer-implemented method for attenuation correction in PET is disclosed. Nuclear scan data including scan data associated with a first imaging modality and background radiation data is received. An initial background radiation attenuation map is generated and provided to a trained model configured to generate a final background radiation based attenuation map from the initial background radiation attenuation map. Attenuation correction of the scan data associated with the first imaging modality is performed based in part on the background radiation based attenuation map. An image is reconstructed from attenuation corrected scan data associated with the first imaging modality.

In various embodiments, a system including a first imaging modality configured to generate a first set of scan data and a plurality of detectors configured to generate background radiation data is disclosed. The system further includes a non-transitory memory having instructions stored thereon and a processor configured to read the instructions to receive the first set of scan data and the background radiation data. An initial background radiation attenuation map is generated and provided to a trained model configured to generate a final background radiation based attenuation map from the initial background radiation attenuation map. Attenuation correction of the first set of scan data is performed in part based on the final background radiation based attenuation map and an image is reconstructed from the attenuation-corrected first set of scan data.

In various embodiments, a computer-implemented method of training a model for generating a background radiation based attenuation map is disclosed. A set of training data comprising one or more initial background radiation attenuation maps and one or more ground truth attenuation maps is received. Each of the one or more ground truth attenuation maps is associated with one of the one or more initial background radiation attenuation maps. An untrained model is iteratively trained based on the set of training data and a trained model configured to generate a background radiation based attenuation map is output.

BRIEF DESCRIPTION OF THE DRAWINGS

The following will be apparent from elements of the figures, which are provided for illustrative purposes and are not necessarily drawn to scale.

FIG. 3 is a flowchart illustrating a method of image reconstruction including attenuation correction using LSO/LYSO background radiation data, in accordance with some embodiments.

FIG. 5 is a flowchart illustrating a method of image reconstruction including attenuation correction using LSO/LYSO background radiation data and a maximum likelihood estimation of activity and attenuation, in accordance with some embodiments.

FIG. 7 is a flowchart illustrating a method of training a machine learning function for use in the method of attenuation correction illustrated in FIG. 3, in accordance with some embodiments.

DETAILED DESCRIPTION

This description of the exemplary embodiments is intended to be read in connection with the accompanying drawings, which are to be considered part of the entire written description.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for performing attenuation correction using attenuation maps obtained from LSO (lutetium oxyorthosilicate)-based or LYSO (lutetium yttrium oxyorthosilicate)-based background radiation data as well as with respect to methods and systems for training a neural network to generate attenuation maps from LSO/LYSO background radiation data. Features, advantages or alternative embodiments herein can be assigned to the other claimed objects and vice versa. In other words, claims for methods and systems for training a neural network to generate an attenuation map using LSO/LYSO background radiation data can be improved with features described or claimed in context of the methods and systems for performing attenuation correction using LSO/LYSO background radiation data, and vice versa.

In general, a trained function mimics cognitive functions that humans associate with other human minds. In particular, by training based on training data the trained function is able to adapt to new circumstances and to detect and extrapolate patterns.

In general, parameters of a trained function can be adapted by means of training. In particular, a combination of supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can comprise a neural network, a support vector machine, a decision tree and/or a Bayesian network, and/or the trained function can be based on k-means clustering, Qlearning, genetic algorithms and/or association rules. In particular, a neural network can be a deep neural network, a convolutional neural network or a convolutional deep neural network. Furthermore, a neural network can be an adversarial network, a deep adversarial network and/or a generative adversarial network.

Figure 1:
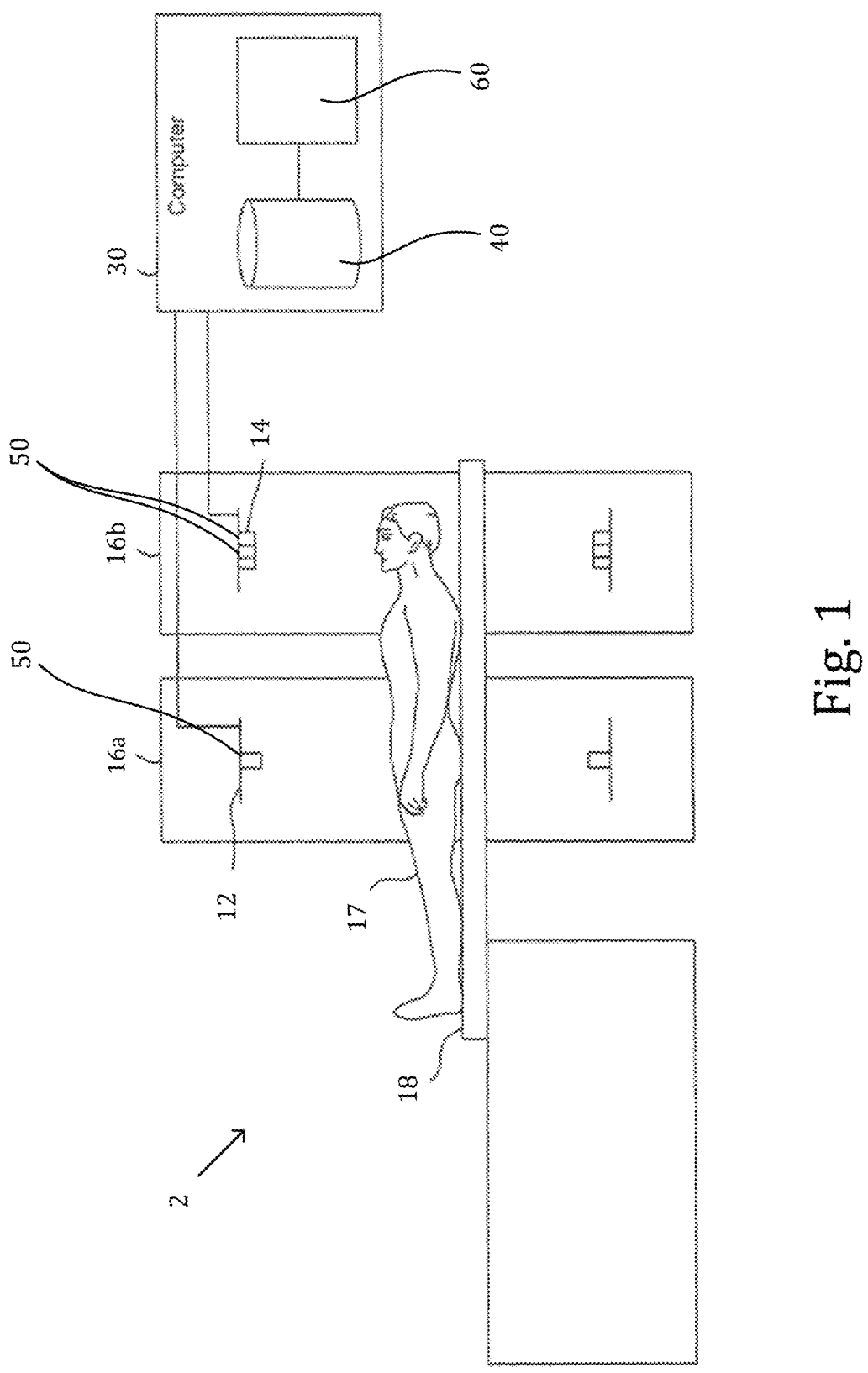
FIG. 1 illustrates a nuclear imaging system, in accordance with some embodiments.

FIG. 1 illustrates one embodiment of a nuclear imaging system 2, in accordance with some embodiments. The nuclear imaging system 2 includes a scanner for at least a first modality 12 provided in a first gantry 16a. The first modality 12 can include any suitable imaging modality, such as a positron emission tomography (PET) modality. A patient 17 lies on a movable patient bed 18 that can be movable between a gantry. In some embodiments, the nuclear imaging system 2 includes a scanner for a second imaging modality 14 provided in a second gantry 16b. The second imaging modality 14 can be any suitable imaging modality, such as, for example, PET modality, a SPECT modality, a CT modality, magnetic resonance (MR) modality, and/or any other suitable imaging modality. Each of the first modality 12 and/or the second modality 14 can include one or more detectors 50 configured to detect an annihilation photon, gamma ray, and/or other nuclear imaging event. In some embodiments, one or more of the detectors 50 generate background radiation data during a scan.

Scan data from the first modality 12 and/or the second modality 14 is stored at one or more computer databases 40 and processed by one or more computer processors 60 of a computer system 30. The graphical depiction of computer system 30 in FIG. 1 is provided by way of illustration only, and computer system 30 can include one or more separate computing devices. The nuclear imaging data sets can be provided by the first modality 12, the second modality 14, and/or can be provided as a separate data set, such as, for example, from a memory coupled to the computer system 30. The computer system 30 can include one or more processing electronics for processing a signal received from one of the plurality of detectors 50. In some embodiments, the scan data includes background radiation-based attenuation. The computer system 30 can use one or more background radiation based attenuation maps during image reconstruction to correct for background radiation attenuation.

In some embodiments, the computer system 30 is configured to generate at least one initial background radiation based attenuation map fro for use in image reconstructions of data obtained by the first modality 12 and/or the second modality 14. The background radiation based attenuation map can be generated using any suitable parameters, such as any suitable algorithms, noise values, event counts, etc. The attenuation map can be generated and/or improved by a trained neural network (or function). In some embodiments, the initial background radiation based attenuation map is generated using a maximum-likelihood transmission (MLTR) algorithm, although it will be appreciated that other algorithms can be applied to generate the initial background radiation based attenuation map.

Figure 2:
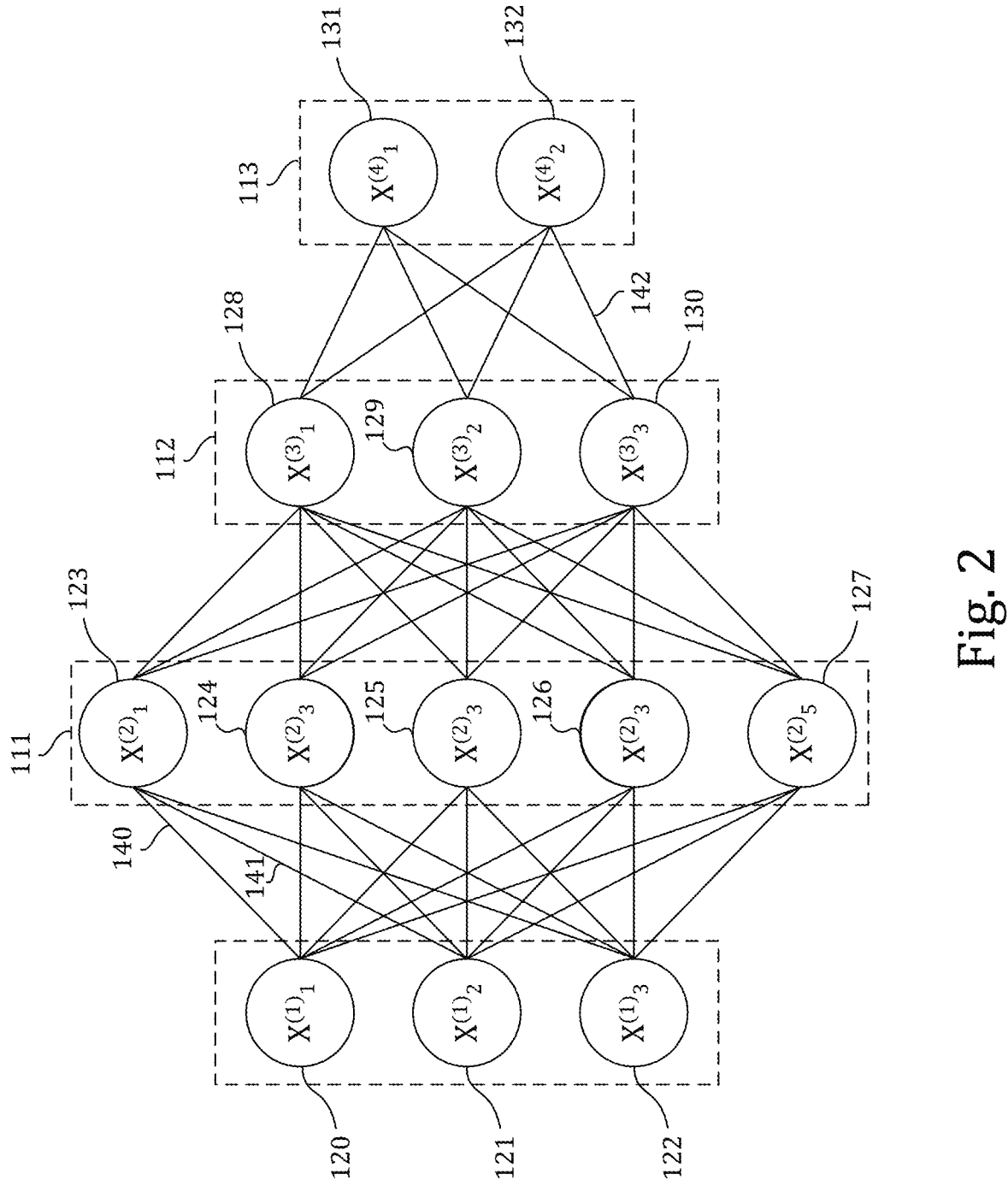
FIG. 2 illustrates an embodiment of an artificial neural network, in accordance with some embodiments.

FIG. 2 displays an embodiment of an artificial neural network 100.

Alternative terms for "artificial neural network" are "neural network," "artificial neural net," "neural net," or "trained function." The artificial neural network 100 comprises nodes 120-132 and edges 140-142, wherein each edge 140-142 is a directed connection from a first node 120-132 to a second node 120-132. In general, the first node 120-132 and the second node 120-132 are different nodes 120-132, although it is also possible that the first node 120-132 and the second node 120-132 are identical. For example, in FIG. 2 the edge 140 is a directed connection from the node 120 to the node 123, and the edge 142 is a directed connection from the node 130 to the node 132. An edge 140-142 from a first node 120-132 to a second node 120-132 is also denoted as "ingoing edge" for the second node 120-132 and as "outgoing edge" for the first node 120-132.

In this embodiment, the nodes 120-132 of the artificial neural network 100 can be arranged in layers 110-113, wherein the layers can comprise an intrinsic order introduced by the edges 140-142 between the nodes 120-132. In particular, edges 140-142 can exist only between neighboring layers of nodes. In the displayed embodiment, there is an input layer 110 comprising only nodes 120-122 without an incoming edge, an output layer 113 comprising only nodes 131, 132 without outgoing edges, and hidden layers 111, 112 in-between the input layer 110 and the output layer 113. In general, the number of hidden layers 111, 112 can be chosen arbitrarily. The number of nodes 120-122 within the input layer 110 usually relates to the number of input values of the neural network, and the number of nodes 131, 132 within the output layer 113 usually relates to the number of output values of the neural network.

In particular, a (real) number can be assigned as a value to every node 120-132 of the neural network 100. Here, $x^{(n)}_i$ denotes the value of the i-th node 120-132 of the n-th layer 110-113. The values of the nodes 120-122 of the input layer 110 are equivalent to the input values of the neural network 100, the values of the nodes 131, 132 of the output layer 113 are equivalent to the output value of the neural network 100. Furthermore, each edge 140-142 can comprise a weight being a real number, in particular, the weight is a real number within the interval [−1, 1] or within the interval [0, 1]. Here, $w^{(m,n)}_{i,j}$ denotes the weight of the edge between the i-th node 120-132 of the m-th layer 110-113 and the j-th node 120-132 of the n-th layer 110-113. Furthermore, the abbreviation $w^{(n)}_{i,j}$ is defined for the weight $w^{(n,n+1)}_{i,j}$.

In particular, to calculate the output values of the neural network 100, the input values are propagated through the neural network. In particular, the values of the nodes 120-132 of the (n+1)-th layer 110-113 can be calculated based on the values of the nodes 120-132 of the n-th layer 110-113 by $$x_j^{(n+1)} = f\left(\Sigma_i x_i^{(n)} \cdot w_{i,j}^{(n)}\right)$$

Herein, the function f is a transfer function (another term is "activation function"). Known transfer functions are step functions, sigmoid function (e.g. the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the first hidden layer 111 can be calculated based on the values of the input layer 110 of the neural network, wherein values of the second hidden layer 112 can be calculated based in the values of the first hidden layer 111, etc.

In order to set the values $w^{(m,n)}_{i,j}$ for the edges, the neural network 100 has to be trained using training data. In particular, training data comprises training input data and training output data (denoted as $t_i$). For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w_{i,j}^{(n)} = w_{i,j}^{(n)} - \gamma \cdot \delta_j^{(n)} \cdot x_i^{(n)}$$

wherein $\gamma$ is a learning rate, and the numbers $\delta^{(n)}_j$ can be recursively calculated as $$\delta_i^{(n)} = (\Sigma_k \delta_k^{(n+1)} \cdot w_{j,k}^{(n+1)}) \cdot f'(\Sigma_i x_i^{(n)} \cdot w_{i,j}^{(n)})$$

based on $\delta^{(n+1)}_j$, if the (n+1)-th layer is not the output layer, and $$\delta_j^{(n)} = (x_k^{(n+1)} - t_j^{(n+1)}) \cdot f'(\Sigma_i x_i^{(n)} \cdot w_{i,j}^{(n)})$$

if the (n+1)-th layer is the output layer 113, wherein f' is the first derivative of the activation function, and $y^{(n+1)}_j$ is the comparison training value for the j-th node of the output layer 113.

In some embodiments, the neural network 100 is configured, or trained, to generate a background radiation based attenuation map. For example, in some embodiments, the neural network 100 is configured to receive background radiation data collected by one or more detectors during a scan of a first patient. The neural network 100 can receive the background radiation data in any suitable form, such as, for example, a listmode or sinogram data, raw data, etc. The neural network 100 is trained to generate an attenuation map (e.g., mu-map).

Figure 4:
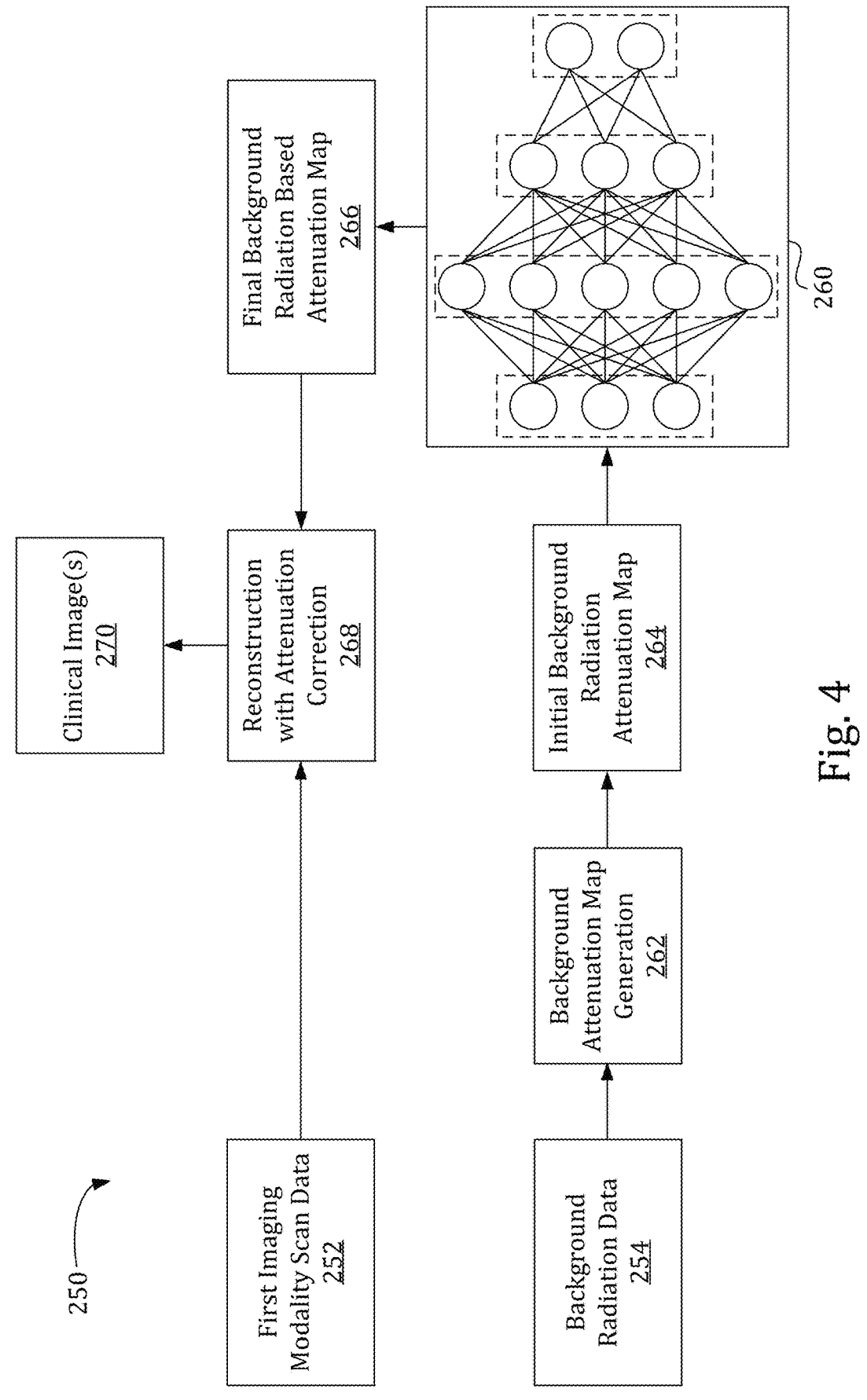
FIG. 4 is a process flow for performing image reconstruction including attenuation correction using LSO/LYSO background radiation data according to the method illustrated in FIG. 3, in accordance with some embodiments.

FIG. 3 is a flowchart 200 illustrating a method of attenuation correction using LSO/LYSO background radiation data, in accordance with some embodiments. FIG. 4 is a process flow 250 for performing attenuation correction using LSO/LYSO background radiation data according to the method illustrated in FIG. 3, in accordance with some embodiments. At step 202, a first set of scan data 252 and a set of background radiation data 254 is received. The first set of scan data 252 is associated with a first imaging modality. The background radiation data 254 is associated with a PET imaging modality. The background radiation data can include LSO (lutetium oxyorthosilicate)-based or LYSO (lutetium yttrium oxyorthosilicate)-based background radiation data. In some embodiments, a second set of scan data (not shown) associated with the second imaging modality is also received. Although specific embodiments are discussed herein, it will be appreciated that the disclosed systems and methods can be applied to any scan data and/or scan modalities including background radiation.

At step 204, an initial background radiation attenuation map 264 is generated from the LSO/LYSO background radiation data 254 by a background attenuation map generation process 262. The initial background radiation attenuation map 264 can generated using any suitable generation process or algorithm, such as, for example, a MLTR process. At step 206, the initial background radiation attenuation map 264 is provided to a trained attenuation model 260 configured to generate a final background radiation based attenuation map 266. The trained model 260 includes a machine learning model trained using a training data set, as discussed in greater detail below. In some embodiments, the trained attenuation model 260 includes a neural network. The trained attenuation model 260 refines and/or improves the initial background radiation attenuation map 264 to generate the final background radiation based attenuation map 266. The final background radiation based attenuation map 266 is used to correct attenuation in the first set of scan data 252. The trained model 260 can include one or more iterative processes for generating the final background radiation based attenuation map 266, including, but not limited to, applying one or more traditional mu-map generation algorithms. As discussed in greater detail below, the trained attenuation model 260 can be trained using CT scan data and/or long scan LSO/LYSO data.

At step 208, attenuation correction is applied to the first set of scan data 252 and, at step 210, one or more clinical images are generated from the attenuation corrected first set of scan data 252. Although steps 208 and 210 are illustrated as separate steps, it will be appreciated that these steps can be performed as part of a single image reconstruction process 268. Attenuation correction is performed by an image reconstruction process 268 based at least in part on the final background radiation based attenuation map 266 using any suitable attenuation correction process.

The clinical images 270 can include, for example, diagnostic images, planning images, and/or any other suitable clinical images. The clinical images 270 can be stored on a non-transitory medium and/or provided to a clinician for use in diagnostics, planning, and/or other purposes. The one or more clinical images 270 can be stored as image files, as attenuation-corrected data, and/or using any other suitable storage method. In some embodiments, the first set of scan data is a PET data set, although it will be appreciated that attenuation correction can also be applied to a second set of scan data including other imaging modalities, such as, for example, SPECT. As discussed in greater detail below, the trained attenuation model 260 can be trained using CT scan data and/or long scan LYSO data.

The method of image reconstruction using background radiation attenuation maps discussed in conjunction with FIG. 3 provides distinct advantages over current systems. For example, current systems primarily rely on CT scans for generation of attenuation maps. The use of attenuation correction maps generated from LSO/LYSO background radiation enables the use of imaging systems without a CT component, reducing costs of the system, cost of operation (i.e., not requiring certain levels of radioactive tracers), and reducing radiation exposure of the patient. Systems without CT components can be made smaller and therefore can be included in spaces not currently capable of supporting, for example, PET/CT systems. In systems including a CT component, the LSO/LYSO background radiation attenuation maps allows for more accurate when MLAA is used to generate attenuation map with attenuation map from background LSO/LYSO as input. The attenuation map output from MLAA is can better matched to emission data thus reducing motion artifacts. Although specific advantages are discussed herein, it will be recognized that additional advantages beyond those discussed are provided by the method of attenuation correction using LSO/LYSO background radiation data discussed herein.

Figure 6:
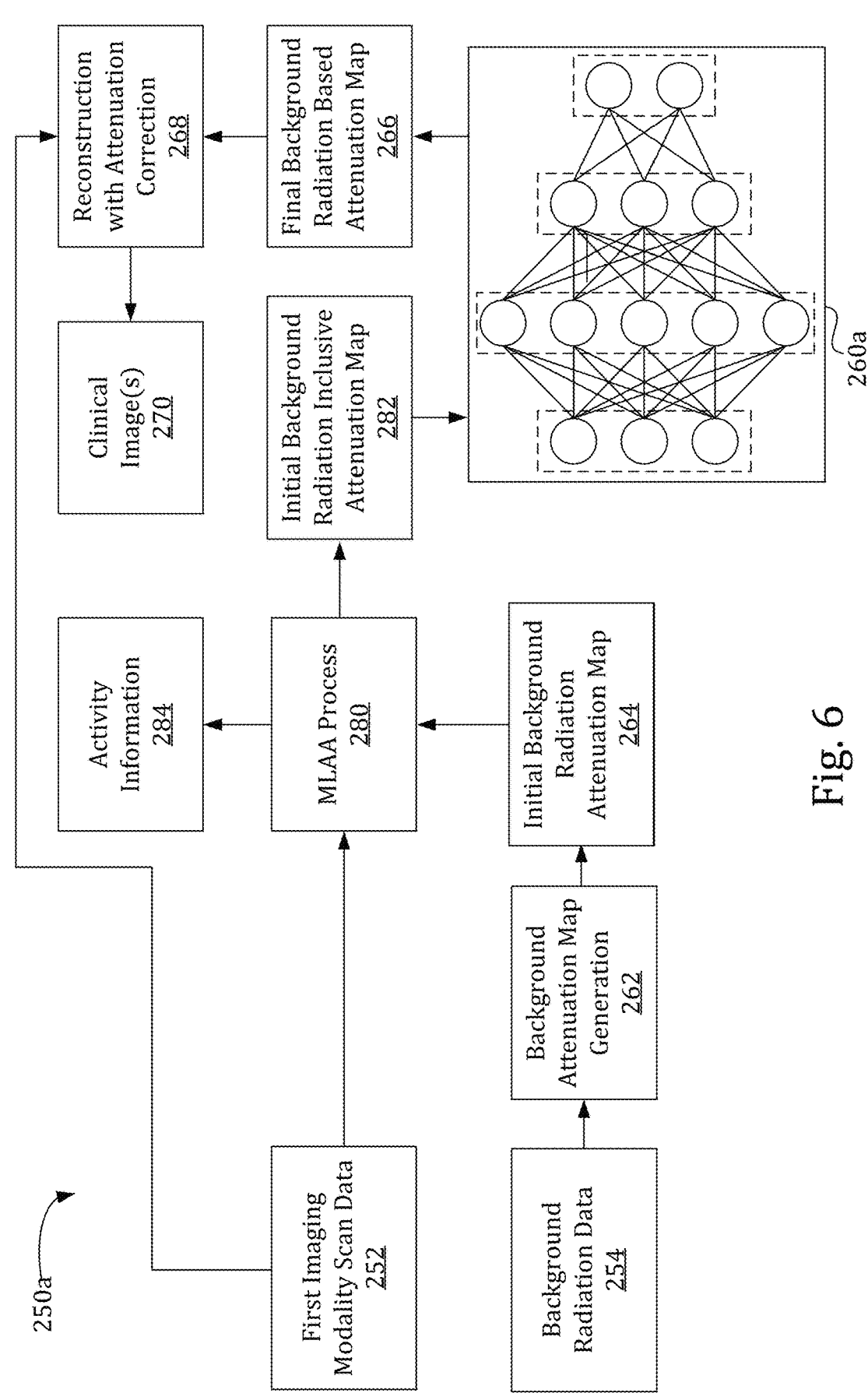
FIG. 6 is a process flow for performing image reconstruction including background radiation attenuation correction according to the method illustrated in FIG. 5, in accordance with some embodiments.

FIG. 5 is a flowchart 200a illustrating a method of image reconstruction including attenuation correction using background radiation based attenuation maps, in accordance with some embodiments. FIG. 6 is a process flow 250a for performing image reconstruction including attenuation correction using background radiation attenuation maps according to the method illustrated in FIG. 5, in accordance with some embodiments. The flowchart 200a and the process flow 250a are similar to the flowchart 200 and process flow 250 discussed above, and similar description is not repeated herein. In some embodiments, after generating the initial background radiation attenuation map 264 at step 204, an initial background radiation inclusive attenuation map 282 is generated using a maximum likelihood estimation of activity and attenuation (MLAA) process 280. For example, in some embodiments, the first set of scan data 252 and the initial background radiation attenuation map 264 are provided to an MLAA process 270 that is configured to generate an initial background radiation inclusive attenuation map 282. In some embodiments, the MLAA process 270 further generates activity information 284 which can be used in reconstructions and/or other processes.

The initial background radiation inclusive attenuation map 282 has a poor signal-to-noise ratio (SNR). The initial background radiation inclusive attenuation map 282 can be provided to a trained attenuation model 260a configured to improve the SNR of the initial background radiation inclusive attenuation map 282 to generate a final background radiation based attenuation map 266 suitable for use in attenuation correction of the scan data 252 generated by the first imaging modality. As discussed in greater detail below, the trained attenuation model 260a can be trained using CT scan data and/or long scan LYSO data.

Figure 8:
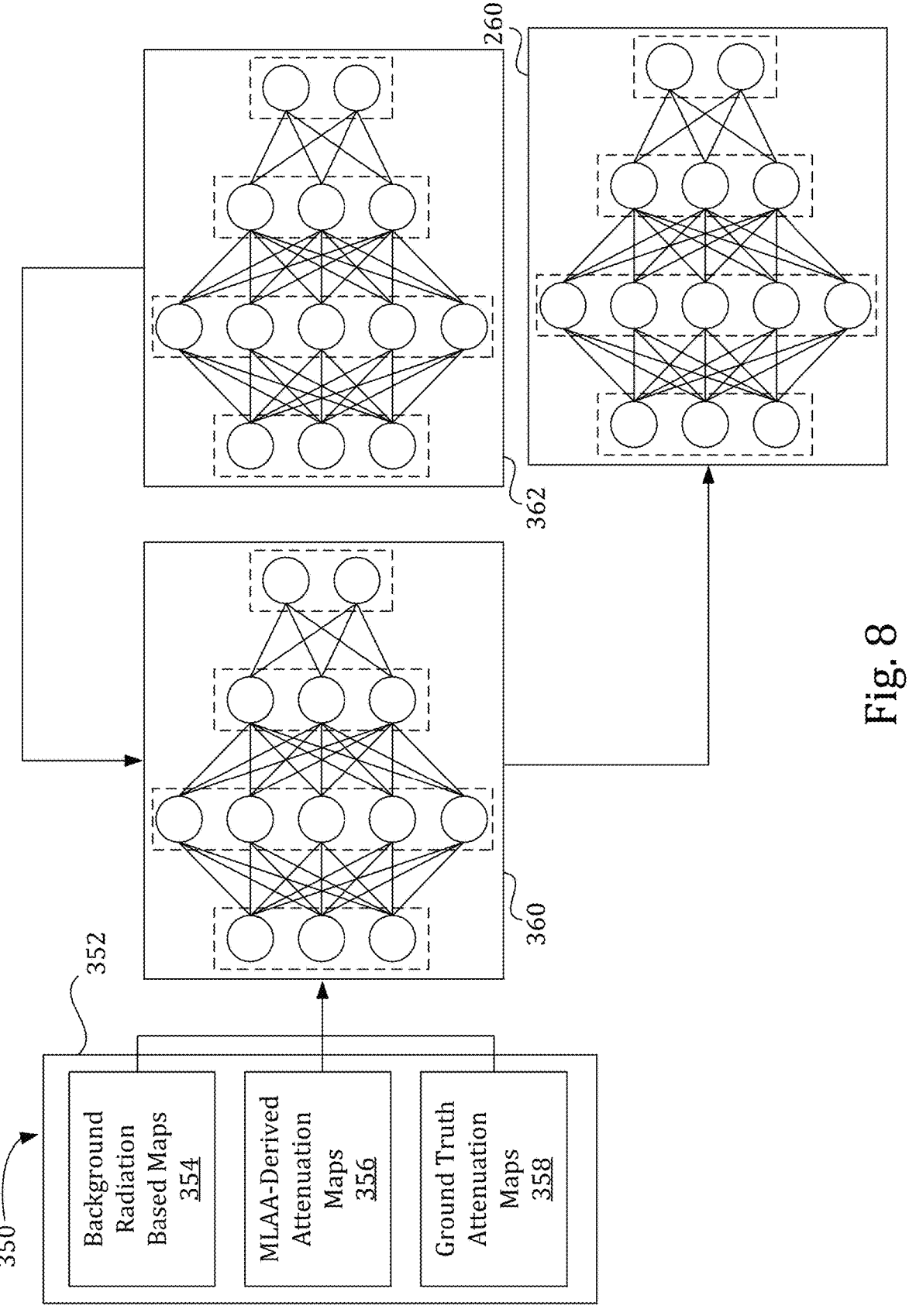
FIG. 8 is a process flow for training a machine learning function according to the method illustrated in FIG. 7, in accordance with some embodiments.

FIG. 7 is a flowchart 300 illustrating a method of training a machine learning model to generate a final background radiation based attenuation map, in accordance with some embodiments. FIG. 8 is a process flow 350 for training a machine learning model according to the method illustrated in FIG. 7, in accordance with some embodiments. At step 302, a set of training data 352 is received. The set of training data includes labeled data configured to iteratively train an untrained machine learning model 358 to generate a final background radiation based attenuation map. The set of training data 352 can include a set of initial background radiation attenuation maps 354, a set of MLAA-generated background radiation inclusive attenuation maps 356, and/or a set of associated ground truth attenuation maps 358. The set of ground truth attenuation maps 358 can be generated by mapping LSO/LYSO background radiation data onto image data from a second imaging modality, such as, for example, a CT imaging modality, generated based on a long-scan LSO/LYSO background radiation data, generated using any other suitable attenuation map generation process, and/or a combination thereof.

In some embodiments, the set of training data 352 can include raw background radiation data and/or TOF PET data and the respective initial background radiation attenuation maps 354 and/or MLAA-generated background radiation inclusive attenuation maps 356 can be generated from the raw data and provided to the untrained model 358. For example, in some embodiments, a set of initial background radiation attenuation maps 354 can be generated from LSO/LYSO background radiation data using a MLTR process. As another example, in some embodiments, a set of MLAA-generated background radiation inclusive attenuation maps 356 can be generated from a set of initial background radiation attenuation maps 354 and raw TOF PET data using a MLAA-process.

At step 304, the set of training data 352 is provided to the untrained machine learning model 360 and, at step 306, the untrained machine learning model 360 performs an iterative training process. In some embodiments, the iterative training process includes training a first set of embedding (or hidden) layers to refine an initial background radiation attenuation map, for example, by comparing to the initial background radiation attenuation map to a corresponding one of the ground truth attenuation maps 356 and making adjustments to the untrained machine learning model 360 based on identified differences. In embodiments including an MLAA-generated background radiation inclusive attenuation maps 356, the machine learning model 360 can be iteratively trained to refine the MLAA-generated background radiation inclusive attenuation map, for example, to increase the SNR, by comparing the MLAA-generated background radiation inclusive attenuation maps 356 to ground truth attenuation maps 358. In some embodiments, an intermediate machine learning model 362 is generated and is used in subsequent iterative training steps. The intermediate machine learning model 362 is further refined using the set of training data 352 to generate a trained machine learning model 260. Although embodiments are discussed herein including an untrained machine learning model 360, it will be appreciated that a previously trained machine learning model can be used as an initial learning model 360 for use in the iterative training process.

At step 308, the trained machine learning model 260 is output. The trained machine learning model 260 is configured to generate a final background radiation based attenuation map for use in attenuation correction. The trained machine learning model 260 can be used to generate final background radiation based attenuation maps for attenuation correction of scan data according to the methods discussed herein, for example, as discussed in conjunction with FIG. 3.

A first embodiment includes a computer-implemented method for attenuation correction. The computer-implemented method includes steps of receiving nuclear scan data including scan data associated with a first imaging modality and background radiation data, applying a trained model configured to generate a background radiation based attenuation map from the background radiation data, performing attenuation correction of the scan data associated with the first imaging modality based on the background radiation based attenuation map, and generating an image from attenuation corrected scan data associated with the first imaging modality.

The computer-implemented method of the first embodiment can include background radiation data comprises LSO (lutetium oxyorthosilicate)-based or LYSO (lutetium yttrium oxyorthosilicate)-based background radiation data. The attenuation correction of the scan data associated with the first imaging modality can be based on a second-imaging modality-based attenuation map.

In the first embodiment, the trained model can be trained by mapping background radiation data to computerized tomography (CT) scan data and/or by mapping background radiation data to long-scan background radiation data generated using a known emission source.

The first embodiment can include the steps of generating an initial background radiation based attenuation map, and providing the initial background radiation based attenuation map to the trained model. The trained model is configured to generate the background radiation based attenuation map by refining the initial background radiation based attenuation map to increase a signal-to-noise ratio. The initial background radiation based attenuation map can be generated using a maximum likelihood estimation of activity and attenuation (MLAA) process.

In the first embodiment, the first imaging modality can be a positron emission tomography (PET) modality and the second imaging modality can be a magnetic-resonance (MR) modality.

In a second embodiment, a system includes a first imaging modality configured to generate a first set of scan data, a plurality of detectors configured to generate background radiation data, a non-transitory memory having instructions stored thereon and a processor configured to read the instructions. The processor receives the first set of scan data and the background radiation data, applies a trained model configured to generate a background radiation based attenuation map from the background radiation data, performs attenuation correction of the first set of scan data based on the background radiation based attenuation map, and generates an image from the attenuation-corrected first set of scan data.

The second embodiment can include a second imaging modality configured to generate a second set of scan data and the plurality of detectors can be associated with the second imaging modality.

The detectors of the second embodiment can include LSO (lutetium oxyorthosilicate)-based or LYSO (lutetium yttrium oxyorthosilicate)-based detectors.

In the second embodiment, the trained model can be trained by mapping background radiation data to computerized tomography (CT) scan data and/or by mapping background radiation data to long-scan background radiation data generated using a known emission source.

The processor can be further configured to generate an initial background radiation based attenuation map, and provide the initial background radiation based attenuation map to the trained model. The trained model is configured to generate the background radiation based attenuation map by refining the initial background radiation based attenuation map to increase a signal-to-noise ratio. The initial background radiation based attenuation map can be generated using a maximum likelihood estimation of activity and attenuation (MLAA) process.

A third embodiment includes a computer-implemented method of training a model for generating a background radiation based attenuation map. The method includes the steps of receiving a set of training data comprising one or more subsets of background radiation data and one or more attenuation maps each associated with one of the one or more subsets of background radiation data, iteratively training an untrained model based on the set of training data, and outputting a trained model configured to generate a background radiation based attenuation map.

In the third embodiment, the set of training data can include a MLAA-based attenuation map associated with each subset of background radiation data. In such instances, the set of training data includes time of flight (TOF) positron emission tomography (PET) (TOF-PET) data. The MLAA-based attenuation map associated with each subset of background radiation data can be generated using the background radiation data and the TOF-PET data.

In the third embodiment, each of the one or more attenuation maps can be generated based on a long-scan background radiation data generated using a known emission source and/or generated based on computerized tomography (CT) scan data.

In a fourth embodiment, the trained model used in either of the first or second embodiments can be generated by the computer-implemented method of the third embodiment.

In a fifth embodiment, a non-transitory computer-readable medium includes instructions, which, when executed by a processor, cause the processor to carry out the method of the first, third, or fourth embodiments.

What is claimed is:

1. A computer-implemented method for attenuation correction, comprising:
    receiving nuclear scan data including scan data associated with a first imaging modality and background radiation data;
    generating an initial background radiation attenuation map;
    applying a trained model configured to generate a final background radiation based attenuation map from the initial background radiation attenuation map;
    performing attenuation correction of the scan data associated with the first imaging modality based on the final background radiation based attenuation map; and
    reconstructing an image from attenuation corrected scan data associated with the first imaging modality.

2. The computer-implemented method of claim 1, wherein the background radiation data comprises LSO (lutetium oxyorthosilicate) or LYSO (lutetium yttrium oxyorthosilicate) background radiation data.

3. The computer-implemented method of claim 1, wherein attenuation correction of the scan data associated with the first imaging modality is additionally based on a second imaging modality derived attenuation map.

4. The computer-implemented method of claim 1, wherein the trained model is trained by mapping one or more initial background radiation attenuation maps to computerized tomography (CT) attenuation maps.

5. The computer-implemented method of claim 1, wherein the trained model is trained by mapping one or more initial background radiation attenuation maps to long-scan background radiation based attenuation maps generated using a known emission source.

6. The computer-implemented method of claim 1, wherein the initial background radiation attenuation map is generated by a maximum-likelihood transmission (MLTR) process.

7. The computer-implemented method of claim 1, comprising generating a background radiation inclusive attenuation map using a maximum likelihood estimation of activity and attenuation (MLAA) process, wherein the initial background radiation based attenuation map and the scan data associated with a first imaging modality are provided as inputs to the MLAA process, and wherein the trained model is configured to generate the final background radiation based attenuation map from the background radiation inclusive attenuation map.

8. The computer-implemented method of claim 1, wherein the first imaging modality is a positron emission tomography (PET) modality.

9. A system, comprising:

a first imaging modality configured to generate a first set of scan data; and a plurality of detectors configured to generate background radiation data;

a non-transitory memory having instructions stored thereon and a processor configured to read the instructions to:

receive the first set of scan data and the background radiation data;

generate an initial background radiation attenuation map;

apply a trained model configured to generate a final background radiation based attenuation map from the initial background radiation attenuation map;

perform attenuation correction of the first set of scan data based on the final background radiation based attenuation map; and reconstruct an image from the attenuation-corrected first set of scan data.

10. The system of claim 9, comprising a second imaging modality configured to generate a second set of scan data, wherein the processor is further configured to read the instructions to generate at least one additional attenuation map is generated from the second set of scan data, wherein attenuation correction of the first set of scan data is performed based on the at least one additional attenuation map.

11. The system of claim 9, wherein the detectors comprise LSO (lutetium oxyorthosilicate) or LYSO (lutetium yttrium oxyorthosilicate) detectors.

12. The system of claim 9, wherein the trained model is trained by mapping one or more initial background radiation attenuation maps to computerized tomography (CT) derived attenuation maps.

13. The system of claim 9, wherein the trained model is trained by mapping one or more initial background radiation attenuation maps to long-scan background radiation based attenuation maps generated using a known emission source.

14. The system of claim 9, wherein the initial background radiation attenuation map is generated by a maximum-likelihood transmission (MLTR) process.

15. The system of claim 14, wherein the processor is configured to read the instructions to generate a background radiation inclusive attenuation map using a maximum likelihood estimation of activity and attenuation (MLAA) process, wherein the initial background radiation based attenuation map and the scan data associated with a first imaging modality are provided as inputs to the MLAA process, and wherein the trained model is configured to generate the final background radiation based attenuation map from the background radiation inclusive attenuation map.

16. A computer-implemented method of training a model for generating a background radiation based attenuation map, comprising:

receiving a set of training data comprising one or more initial background radiation attenuation maps and one or more ground truth attenuation maps, wherein each of the one or more ground truth attenuation maps is associated with one of the initial background radiation attenuation maps;

iteratively training an untrained model based on the set of training data; and outputting a trained model configured to generate a final background radiation based attenuation map.

17. The computer-implemented method of claim 16, wherein the set of training data comprises one or more MLAA-based background radiation inclusive attenuation maps each associated with one of the one or more ground truth attenuation maps.

18. The computer-implemented method of claim 16, wherein the set of training data includes time of flight (TOF) positron emission tomography (PET) (TOF-PET) data, and wherein the MLAA-based background radiation inclusive attenuation maps are generated using one of the one or more initial background radiation attenuation maps and a subset of the TOF-PET data.

19. The computer-implemented method of claim 16, wherein each of the one or more ground truth attenuation maps are generated based on a long-scan LSO/LYSO background radiation data generated using a known emission source.

20. The computer-implemented method of claim 16, wherein each of the one or more ground truth attenuation maps are generated based on computerized tomography (CT) scan data.

* * * * *